United States Patent [19]

Thomann

[11] 4,310,316
[45] Jan. 12, 1982

[54] DIET CONTROL APPARATUS

[76] Inventor: Patricia L. Thomann, 10393 Diamond Park Rd., Interlochen, Mich. 49643

[21] Appl. No.: 82,701

[22] Filed: Oct. 9, 1979

Related U.S. Application Data

[63] Continuation of Ser. No. 856,401, Dec. 1, 1977, abandoned.

[51] Int. Cl.³ .............................................. G09B 19/00
[52] U.S. Cl. ................................................ 434/127
[58] Field of Search ......................................... 434/127

[56] References Cited

U.S. PATENT DOCUMENTS

| | | | |
|---|---|---|---|
| 1,330,089 | 2/1920 | Plauche | 434/96 |
| 2,314,387 | 3/1943 | Carlsson | 434/127 |
| 2,337,594 | 12/1943 | Easley | 434/127 |
| 3,681,857 | 8/1972 | Yardley | 434/127 |

Primary Examiner—William H. Grieb
Attorney, Agent, or Firm—Lon H. Romanski

[57] ABSTRACT

A diet control means is shown as having lists of various food categories with each of such categories, in turn, listing specific items of food and the respective quantities thereof which constitute what may be referred to as obtainable with a single ticket; a plurality of containers, corresponding to the number of meals to be eaten during a twenty-four hour period, respectively contain a plurality of tickets which are, in turn, redeemable for obtaining a quantity of dieter-selected specific food item within the food category designated by the respective ticket; as the tickets are thusly redeemed during the twenty-four hour period, such tickets are considered spent and placed as within a container for the collection thereof.

19 Claims, 16 Drawing Figures

Fig. 2.

BREADS: BREAD 1 SLICE; BISCUIT OR MUFFIN 1, 2IN.; CORNBREAD 1 1/2 IN.CUBE; FLOUR 2 1/2 TBSP; CEREAL 1/2 C.COOKED; CEREAL 3/4 C DRY; RICE, GRITS, SPAGHETTI, NOODLES, MACARONI, DRY PEAS OR BEANS, MASHED POTATOES-1/2C, COOKED; GRAHAM CRAX 2; SODA CRAX 3; BAKED BEANS 1/4C, CORN 1/3C; SWEET POTATOES 1/4C; 1 WHITE POTATO 2 IN. DIAMETER; SPONGE CAKE 1 1/2 IN.CUBE; ICE CREAM 1/2 C (OMIT 2 FATS); TABLE WINE 3 1/2 OZ.; 80 PROOF LIQUOR 1 OZ. (NOTE THAT A JIGGER IS USUALLY 1 1/2 OZ.); BEER 6 OZ.; COLLINS MIX ETC. 5 OZ.

MILK: WHOLE 1C; SKIM 1C; BUTTERMILK 1C (ADD 2 FATS TO DIET FOR EACH FAT FREE MILK USED, UNLESS TICKET SPECIFIES SKIM MILK); EVAPORATED 1/2 C; YOGURT, PLAIN, MADE WITH SKIM MILK 1C.

FATS: BUTTER, MARGERINE, MAYONNAISE, 1 TSP; CREAM, SALAD DRSG., OIL 1 TBSP; BACON 1 CRISP SLICE; NUTS 6 SMALL; OLIVES 5 SMALL; AVACADO 1/8 (OF 4 INCH DIAMETER); SOUR CREAM 2 TBSP; CREAM CHEESE 1 INCH CUBE.

DIET BANK

FOR: I'M BLOATED
DIET: 1500 CAL.WEIGHT REDUCTION

MEATS: MEAT AND POULTRY 1 SLICE (3x2x1/8 IN. OR 1 OZ.) NO SKIN OR FAT; COLD CUT 1 SLICE; HOT DOG 1; CODFISH, HALIBUT, ETC. 1 SLICE (2x2x1 IN.); SALMON, TUNA, CRAB, LOBSTER 1/4C; OYSTERS, SHRIMP, CLAMS 5 MED.; COTTAGE CHEESE 1/4C; SARDINES 3 MED.; YELLOW CHEESE 1 SLICE (3 1/2 x 1 1/2 x 1/4 IN.); 1 EGG; PEANUT BUTTER 2 TBSP.- LIMIT PEANUT BUTTER TO 1 SERVING/DAY

FRUIT: APPLE 1 SM; APPLE SAUCE 1/2 C.; APRICOTS 2 MED.; BANANA 1/2 SM.; BERRIES 1C; CHERRIES 10; DATES 2; ORANGE 1 SM.; GRAPEFRUIT 1/2 SM.; MELON 1 PIECE (ABOUT 1 CUP MELON MEAT); GRAPES 12; GRAPE JUICE 1/4 C.; PEACH 1 MED.; GRAPE- FRUIT OR ORANGE JUICE 1/2 CUP; PEAR 1 SMALL; PINEAPPLE 1/2 C.; PINEAPPLE JUICE 1/3 C.; PLUMS 2 MED.; RAISINS 2 TBSP.

VEGETABLES: GROUP B 1/2C BEETS, CARROTS, ONIONS, PEAS, PUMPKIN, RUTABAGAS, WINTER SQUASH, TURNIPS. GROUP A SEE BELOW

FREE FOODS:
GROUP A VEGETABLES: RAW, UNLIMITED (IF COOKED, 1 CUP LIMIT)
ASPARAGUS, BROCCOLI, BRUSSEL SPROUTS, CABBAGE, CAULIFLOWER, CUCUMBER, CELERY, EGGPLANT, LETTUCE, SPINACH, MUSHROOMS, PEPPERS, RADISHES, RHUBARB (NO SUGAR), SAUERKRAUT, GREEN BEANS, SUMMER SQUASH, TOMATOES, WATERCRESS.
OTHER: COFFEE, TEA, CLEAR BROTH, BOULLION, LEMON, GELATIN (UNSWEETENED), MUSTARD, DILL PICKLES, PEPPER, VINEGAR, SPICES, NON-CALORIE SWEETNERS, DIET SOFT DRINKS.

Fig. 3.

MEAL: *BREAKFAST*    FOR: *I.M. BLOATED*
DIET: 1500 CALORIE WEIGHT REDUCTION

| LIST (*) | #OF TICKETS |
|---|---|
| BREAD | 2 |
| MILK | 1 |
| FAT | 1 |
| MEAT | 1 |
| FRUIT | 1 |
| TOTAL NUMBER OF TICKETS | 6 |

(*) ALSO SEE "FREE FOODS" LIST

Fig. 4.

MEAL: *LUNCH*    FOR: *I.M. BLOATED*
DIET: 1500 CALORIE WEIGHT REDUCTION

| LIST (*) | #OF TICKETS |
|---|---|
| BREAD | 2 |
| MILK | 1 |
| FAT | 1 |
| MEAT | 2 |
| FRUIT | 1 |
| "A" VEGETABLE | 1 |
| TOTAL NUMBER OF TICKETS | 8 |

(*) ALSO SEE "FREE FOODS" LIST

Fig. 5.

MEAL: *DINNER*    FOR: *I.M. BLOATED*
DIET: 1500 CALORIE WEIGHT REDUCTION

| LIST (*) | #OF TICKETS |
|---|---|
| BREAD | 2 |
| MILK | 0 |
| FAT | 1 |
| MEAT | 3 |
| FRUIT | 1 |
| "B" VEGETABLE | 1 |
| "A" VEGETABLE | 1 |
| TOTAL NUMBER OF TICKETS | 9 |

(*) ALSO SEE "FREE FOODS" LIST

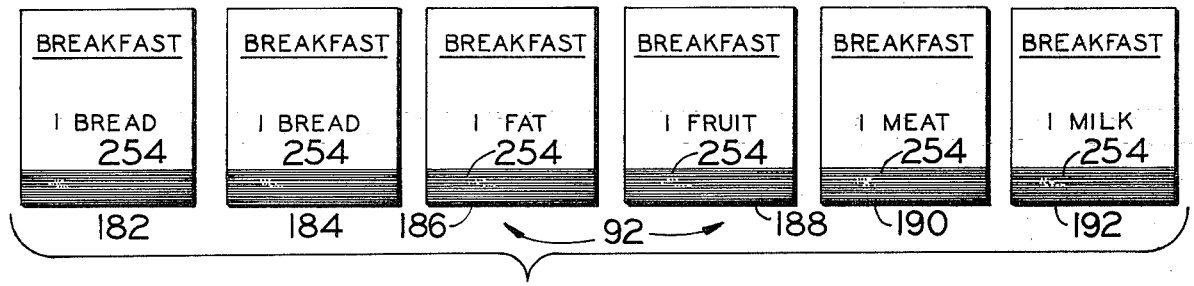
Fig.6.
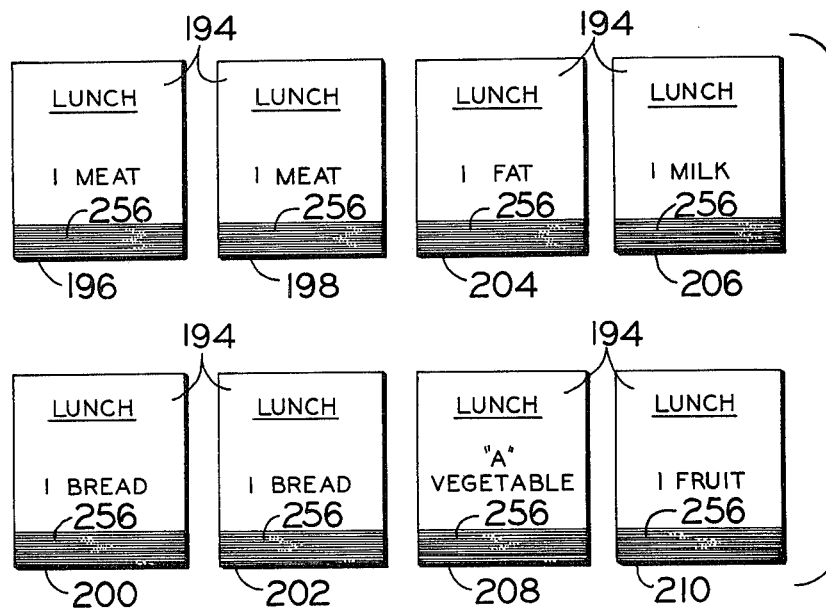
Fig.7.
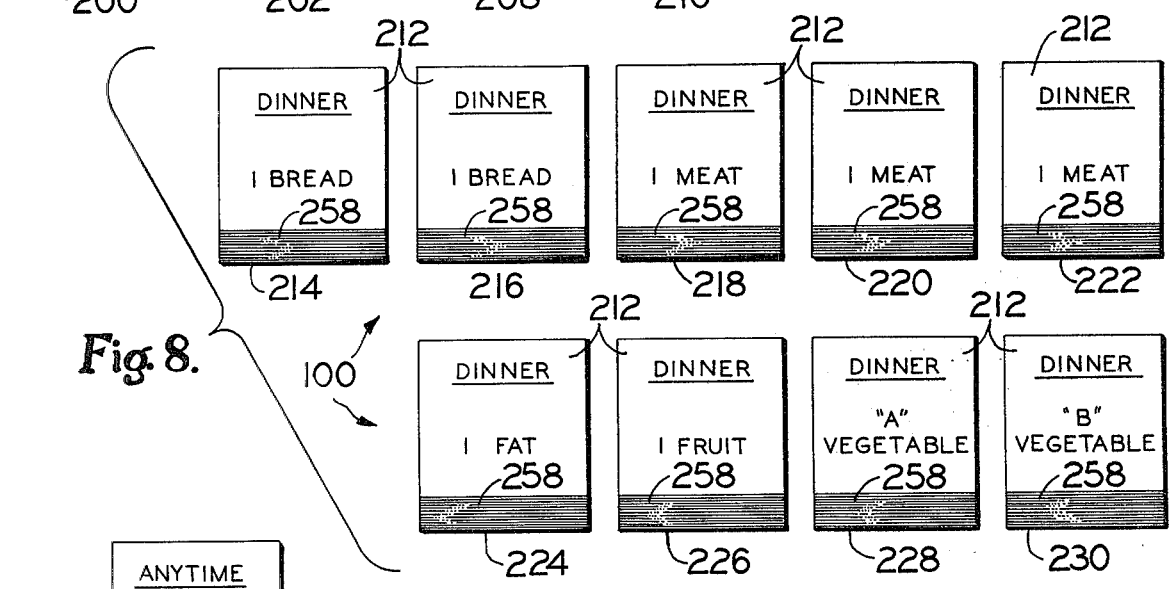
Fig.8.
Fig.9.

DIET CONTROL APPARATUS

This is a continuation of application Ser. No. 856,401, filed Dec. 1, 1977, now abandoned.

BACKGROUND OF THE INVENTION

As is commonly known, one of the health problems most prevelant in especially the United States of America is that of overweight. This, in turn, has given rise to the establishment of many so-called health studios, health spas and fad-type diets along with the publication of many books usually for the sole purpose of providing either services or instructions by which one can reduce weight. Currently, the latest diet fad is what is referred to as the "liquid protein" diet whereby, in the main, the dieter consumes what amounts to pre-digested protein in liquid form.

With very few exceptions (such as, for example, body water retention) the only way in which a person gains weight is by consuming more calories than are required by the body metabolism for maintaining the required energy level. Accordingly, it frequently happens that a person who has, for example, attended a health spa or has faithfully followed some properly prescribed diet plan and consequently reduced body weight to the desired amount finds that weight is again being gained. This is attributable to the fact that the person, even though initially succeeding in weight reduction, has not in fact learned (during the weight reduction program) proper eating habits. Therefore, even though the weight reduction program was successfully completed, subsequently, improper eating habits again result in the gaining of weight. Such weight gain may be comparatively slow; for example, one ounce per day is not noticed from a day-to-day basis; however, over a six month span of time such would amount to a little over eleven pounds. Obviously, for a person whose desired body weight is 110 lbs., such a rate of weight gain means a 10% increase in six months and a 20% increase in a year.

Accordingly, the problem of maintaining proper body weight is a factor which often results in excessive body weight. It is a rather common experience to see or hear dieters as in, for example, a restaurant counting the caloric values of the various specific items of foods served to them. Experience has shown that such "calorie counters" continually have weight problems and really never do learn proper eating habits in that their mental focus is continually on the caloric value of a food rather than on the food per se. It is somewhat akin to one attempting to describe a rainbow by listing the wave lengths of the color spectrum comprising the rainbow rather than, for example, actually seeing the rainbow.

Not only are calories important, it is also important to obtain the calories by a variety of foods selected as to provide the proper nutritional value to the body. Also, it is known that even though when measured over a twenty-four hour span there is a maximum amount of calorie intake (for any particular person) that additional benefits are derived if such total calorie intake is consumed in selected foods and selected amounts at specified intervals during such a twenty-four hour span. Accordingly, it can be seen that the typical "calorie counter" does not achieve these goals since being concerned with calories to the exclusion of all other factors will not achieve a proper diet regardless of the ultimate purpose of such diet.

Further, it has become apparent that many "calorie counters" finally abandon their diets merely because they find it to be drudgery to continue.

Accordingly, the invention as herein disclosed and claimed is primarily concerned with and directed to the elimination of problems and shortcomings attendant the heretofore manner of establishing and practicing diets and diet plans.

SUMMARY OF THE INVENTION

According to the invention, a plurality of tickets, vouchers coupons or the like are provided with each of such tickets bearing thereon a selected particular food group designation; the plurality of tickets are arranged into selected groups of tickets with each group comprising the number of tickets for a particular designated meal; the dieter, using such tickets, redeems the ticket (or tickets) for a specific food item (or items) within the particular food group designation as identified in an accompanying chart of food groups and good items; at the end of the day any unredeemed tickets and all redeemed tickets are again replaced into the same selected groups of tickets for use in the same manner during the following day.

Various general and specific objects, advantages and aspects of the invention will become apparent when reference is made to the following detailed description of the invention considered in conjunction with the accompanying drawings.

BRIEF DESCRIPTION OF THE DRAWINGS

In the drawings wherein for purposes of clarity certain details and/or elements may be omitted from one or more views:

FIG. 2 is a relatively enlarged view of one of the elements shown in FIG. 1, illustrating such in greater detail;

FIG. 3 is a relatively enlarged view of another of the elements shown in FIG. 1, illustrating such in greater detail;

FIG. 4 is a relatively enlarged view of still another of the elements shown in FIG. 1, illustrating such in greater detail;

FIG. 5 is a relatively enlarged view of yet another of the elements shown in FIG. 1, illustrating such in greater detail;

FIG. 6 is a relatively enlarged view of tickets or the like some of which are illustrated in FIG. 1;

FIG. 7 is a relatively enlarged view of other tickets or the like some of which are illustrated in FIG. 1;

FIG. 8 is a relatively enlarged view of still other tickets or the like some of which are illustrated in FIG. 1;

FIG. 9 is a view of still another type of ticket or the like employable in the practice of the invention;

DETAILED DESCRIPTION OF THE PREFERRED EMBODIMENT

Figure 1:
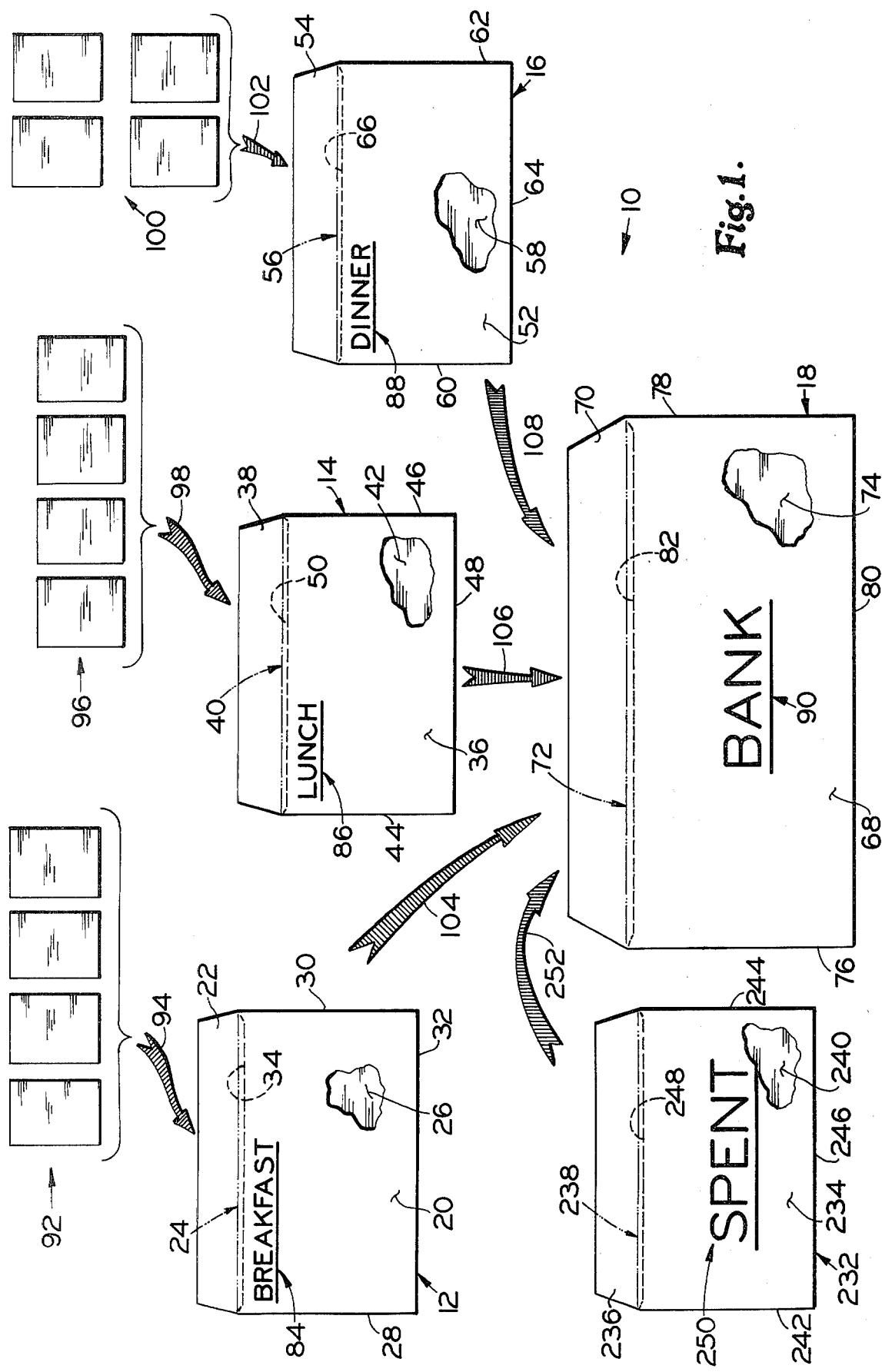
FIG. 1 is a simplified illustration of some of the elements comprising the invention shown in what may be considered to be a flow chart like arrangement.

Referring now in greater detail to the drawings, the diet control apparatus 10 is illustrated as comprising a plurality of container means 12, 14, 16 and 18. Such container means, may, for example, have envelope-like configurations. That is, container means 12 may comprise a front wall 20, with an upper disposed flap-like portion 22 foldable as on a line 24, and a rear wall 26 with such walls being closed as along side edges 28 and 30 and lower or bottom edge 32. The upper edge 34 of rear wall 26, open with respect to front wall 20, is generally closeable by the flap portion 22 when folded thereover. The walls thusly define therebetween a pocket or chamber means.

Container means 14 may comprise a front wall 36, with an upper disposed flap-like portion 38 foldable as on a line 40, and a rear wall 42 with such walls being closed as along side edges 44 and 46 and lower or bottom edge 48. The upper edge 50 of rear wall 42, open with respect to front wall 36, is generally closeable by the flap portion 38 when folded thereover. The walls 36 and 42 also thusly cooperatively define therebetween a pocket or chamber means.

Container means 16 may similarly comprise a front wall 52, with an upper disposed flap-like portion 54 foldable as on a line 56, and a rear wall 58 with such walls being closed as along side edges 60 and 62 and lower or bottom edge 64. The upper edge 66 of rear wall 58, open with respect to front wall 52, is generally closeable by the flap portion 54 when folded thereover. The walls 52 and 58 also thusly cooperatively define a pocket or chamber means therebetween.

Further, container means 18 may also similarly comprise a front wall 68, with an upper disposed flap-like portion 70 foldable on a line 72, and a rear wall 74 with such walls being closed as along side edges 76 and 78 and lower or bottom edge 80. The upper edge 82 of rear wall 74, open with respect to front wall 68, is generally closeable by the flap portion 70 when folded thereover. The walls 68 and 74 also thusly cooperatively define a pocket or chamber means therebetween.

In the preferred embodiment of the invention, container means 12, 14 and 16 are provided with legend means or indicia such as "Breakfast", "Lunch" and "Dinner" respectively depicted at 84, 86 and 88 to thereby designate the particular meal to which such container means relates. Similarly, and not by way of limitation but merely by way of example, container means 18 is also preferably provided with suitable legend means or indicia such as, for example, "Bank" as depicted at 90.

As generally illustrated in FIG. 1, one or more first ticket means or token means, collectively designated by reference number 92, relate to (as will be more fully described) the "Breakfast" meal and are adapted to be received within the pocket or chamber means of container means 12 as depicted generally by arrow 94. Further, one or more second ticket means or token means, collectively designated by reference number 96, relate to (as will be more fully described) the "Lunch" meal and are adapted to be received within the pocket or chamber means of container means 14 as depicted generally by arrow 98. Also, one or more third ticket means or token means, collectively designated by reference number 100, relate to (as will be more fully described) the "Dinner" meal and are adapted to be received within the pocket or chamber means of container means 16 as depicted generally by arrow 102.

Such container means 12, 14 and 16, respectively containing ticket means 92, 96 and 100, are in turn adapted to be received within the pocket or chamber means of container means 18 as generally depicted by respective arrows 104, 106 and 108.

FIG. 2, an enlarged view of container means 18 of FIG. 1, illustrates in greater detail further details of the preferred embodiment of such container means. As can be seen, in the preferred embodiment, container means 18 is provided with divisions or divided areas generally designated by the respective brackets and reference numbers 110, 112, 114, 116, 118, 120 and 122. Each of such divided areas are devoted to a particular catagory of foods which are identified as by the legends "Breads", "Milk", "Fats", "Meats", "Fruits", "Vegetables" and "Free Foods" respectively identified by reference numbers 124, 126, 128, 130, 132, 134 and 136. Further, in turn, each of the respective catagories lists specific items of food with each such item being further identified in quantitative terms. For example, in the 37 Breads" catagory, among other many specific items of food, are the identification of "cereal ½ C cooked;" and "sponge cake 1½ inch cube". This, in effect, means that: (a) each of the specific items of food, such as the cereal and sponge cake, is regarded as being a "Bread"; and (b) that a "unit" or "serving" of such specific food item is: (i) as with regard to the cereal, half a cup as cooked and (ii) as with regard to the sponge cake, a cube one and a half inches on a side. The term "serving" is not to be thought of as necessarily meaning that such is the maximum quantity of that specific food item which may be consumed at a particular meal; rather, it is merely a unit of measurement in the overall diet schedule. The same applies to each of the other food catagories wherein, again, a recitation of the specific food items comprising that catagory are listed and the respective quantity thereof, defining a "unit" or "serving", is listed along side each such specific food item.

Further, in the preferred embodiment the dieter's name may be placed as at 138 and the type of diet identified as at 140.

FIG. 3 illustrates in enlarged scale and in greater detail the container means 12 of FIG. 1.

Referring in greater detail to FIG. 3, in the preferred embodiment of container means 12 suitable additional legend means 142 is preferably provided on the front thereof. The legend means 142, as indicated, may comprise a first caption of "List", as at 144, and a second caption of "Number of Tickets", as at 146. Arranged immediately below the caption "List" is a series of food catagories 147 (in this instance: "Bread", "Milk", "Fat", "Meat" and "Fruit") and along side each of these listed catagories and immediately below the caption "Number of Tickets" appear respective numbers 149 which, in turn, indicate the quantity of such tickets as should be within the chamber of the container means 12 as at the start of a particular day in question. Also, similarly to that depicted in FIG. 2, the dieter's name and the type of diet may also be identified as at 148 and 150, respectively.

FIG. 4 illustrates in enlarged scale and in greater detail the container means 14 of FIG. 1. Referring in greater detail to FIG. 4, in the preferred embodiment of container means 14 suitable additional legend means 152 is preferably provided on the front thereof. The legend means 152, as indicated, may comprise a first caption of "List", as at 154, and a second caption of "Number of Tickets", as at 156. Arranged immediately below the caption "List" is a series of food catagories 158 (in this instance: "Bread", "Milk", "Fat", "Meat", "Fruit" and "'A' Vegetable") and along side each of these listed catagories and immediately below the caption "Number of Tickets" appear respective numbers 160 which, in turn, indicate the quantity of such tickets as should be within the chamber means of the container means 14 as at the start of a particular day in question. Similarly to that depicted in FIGS. 2 and 3, the dieter's name and the type of diet may also be identified as at 162 and 164, respectively.

FIG. 5 illustrates in enlarged scale and in greater detail the container means 16 of FIG. 1. Referring in greater detail to FIG. 5, in the preferred embodiment of container means 16 suitable additional legend means 166 is preferably provided on the front thereof. The legend means 166, as indicated, may comprise a first caption of "List", as at 168, and a second caption of "Number of Tickets", as at 170. Arranged immediately below the caption "List" is a series of food catagories 172 (in this instance: "Bread", "Milk", "Fat", "Meat", "Fruit", "'B' Vegetable" and "'A'" Vegetable") and along side each of these listed catagories and immediately below the caption "Number of Tickets" appear respective numbers 174 which, in turn, indicate the quantity of such tickets as should be within the chamber means of the container means 16 as at the start of a particular day in question. Similarly to that depicted in FIGS. 2, 3 and 4, the dieter's name and the type of diet may also be identified as at 176 and 178, respectively.

FIG. 6 illustrates the ticket means or token means 92 as would be contained within container means 12. As depicted, the ticket means 92 may be of generally square or rectangular configuration and are preferably provided with legend means as at the top thereof, in this case, with the word "Breakfast" as at 180 of each of the tickets 92. Further, ticket or token 182 bears the legend "1 Bread"; similarly, ticket or token 184 bears the same legend "1 Bread"; while tickets or tokens 186, 188, 190 and 192 respectively bear the legends: "1 Fat", "1 Fruit", "1 Meat" and "1 Milk". In comparing FIGS. 3 and 6, it can be seen that the respective legends on the tickets 92 correspond to the list of food catagories appearing at 147 of container means 12 and that the total number of such tickets 92 corresponds to the total number indicated on container means 12.

FIG. 7 illustrates the ticket means or token means 96 as would be contained within container means 14. As depicted, the ticket means 96 may be of generally square or rectangular configuration and are preferably provided with legend means as at the top thereof, in this case, with the word "Lunch" as at 194 of each of the tickets 96. Further, tickets or tokens 196 and 198 each bear the legend "1 Meat"; similarly, tickets or tokens 200 and 202 each bear the legend "1 Bread"; while tickets or tokens 204, 206, 208 and 210 respectively bear legends "1 Fat", "1 Milk", "'A' Vegetable" and "1 Fruit". In comparing FIGS. 4 and 7, it can be seen that the respective legends on the tickets 96 correspond to the list of food catagories appearing at 158 of container means 14 and that the total number of such tickets 96 corresponds to the total number indicated on container means 14.

FIG. 8 illustrates the ticket means or token means 100 as would be contained within container means 16. As depicted, the ticket means 100 may be of generally square or rectangular configuration and are preferably provided with legend means as at the top thereof, in this case, with the word "Dinner" as at 212 of each of the tickets 100. Further, tickets or tokens 214 and 216 each bear the legend "1 Bread"; tickets or tokens 218, 220 and 222 each bear the legend "1 Meat"; while tickets or tokens 224, 226, 228 and 230 respectively bear legends "1 Fat", "1 Fruit", "'A Vegetable" and "'B' Vegetable". In comparing FIGS. 5 and 8, it can be seen that the respective legends on the tickets 100 correspond to the list of food catagories appearing at 172 of container means 16 and that the total number of such tickets 100 corresponds to the total number indicated on container means 16.

Operation of Invention

For purposes of describing the overall operation and use of the invention, certain conditions are assumed. That is, even though the practice of the invention is not so limited, it is assumed: (a) that the dieter has been placed on a weight reduction diet of, for example, 1500 calorie intake per day; (b) that a "day" is to be considered as one continuous span of time of twenty-four hours duration and that such commences on, for example, midnight; and (c) that it has been determined that the dieter will have three principal meals during the day with the first of such being called "Breakfast", the second of such being called "Lunch" and the third of such being called "Dinner".

Now let it be assumed that: (a) all of the tickets or tokens 92 of FIG. 6 are situated within container means 12 of FIG. 3; (b) all of the tickets or tokens 96 of FIG. 7 are situated within container means 14 of FIG. 4 and (c) all of the tickets or tokens 100 of FIG. 8 are situated within container means 16 at the beginning of the day or at some time prior to the "Breakfast" meal. Further, let it be assumed that the container means 12, 14 and 16 are each received within container means 18 of FIG. 2.

At the "Breakfast" meal, the dieter removes tickets 92 and, using the chart as on container means 18, makes a selection of the specific food items from the catagories of foods as designated by the legends on the respective tickets 92. For example, the dieter could select: (using ticket 182) one slice of bread; (using ticket 184) one-half cup of cooked cereal; (using ticket 186) one teaspoon of butter as for the bread; (using ticket 188) one-half of a small grapefruit; (using ticket 190) one egg; and (using ticket 192) one cup of whole milk.

At the "Lunch" meal, the dieter removes tickets 96 and, using the chart as on container means 18, makes a selection of the specific food items from the catagories of foods as designated by the legends on the respective tickets 96. For example, the dieter could select: (using tickets 196 and 198) one-half cup of crab; (using ticket 208) lettuce on which the crab could be placed and one cup of cooked eggplant; (using tickets 200 and 202) seven ounces of table wine; (no ticket required) coffee; (using ticket 206) one cup of whole milk; (using ticket 204) five small olives; and (using ticket 210) one slice of melon.

At the "Dinner" meal, the dieter removes tickets 100 and, using the chart as on container means 18, makes a selection of the specific food items from the catagories of foods as designated by the legends on the respective tickets 100. For example, the dieter could select: (using ticket 214) one slice of bread; (using tickets 218, 220 and 222) three ounces of meat; (using ticket 216) one two-inch diameter white potato; (using ticket 224) two tablespoons of sour cream as for the potato; (using ticket 228) one cup of cooked green beans; (using ticket 230) one half cup cooked winter squash; and (using ticket 226) one-half cup applesauce.

The description as to how the dieter could employ the tickets at each of the assumed meals makes the supposition that the dieter has employed all of the allocated tickets for each meal. If that is the case, the dieter upon thusly using all of the tickets, for any particular meal, may merely return them to the related container means at that meal as for example: used tickets 92 into container means 12 for the next day's "Breakfast" meal; upon use, tickets 96 into container means 14 for the next day's "Lunch" meal; and upon use, tickets 100 into container means 16 for the next day's "Dinner" meal.

Figure 10:
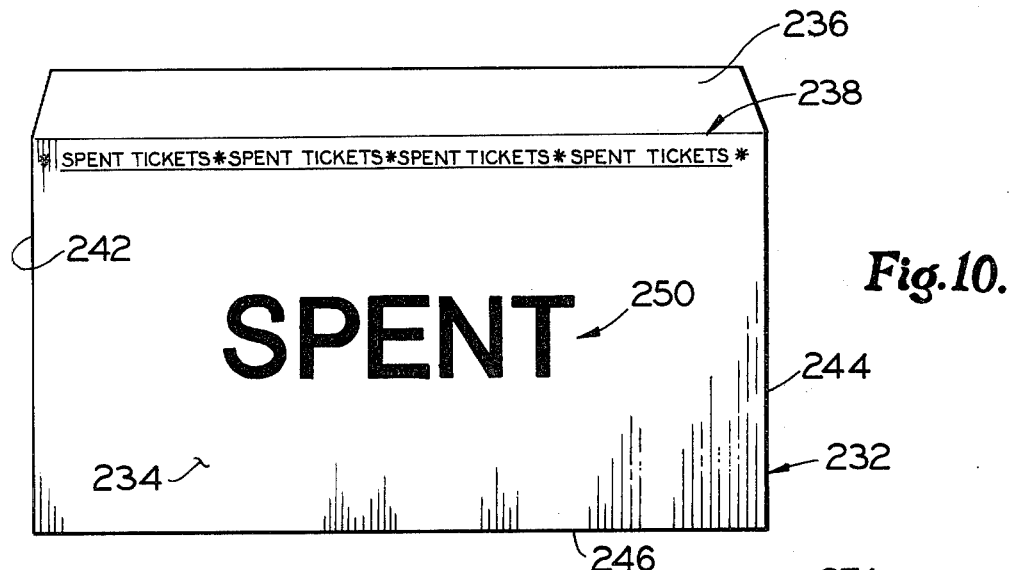
FIG. 10 is a relatively enlarged view of another element shown in FIG. 1, illustrating such in greater detail.

However, through experimentation and testing, it has been discovered that quite often the dieter does not use all of the tickets allocated for the "Breakfast", "Lunch" and/or "Dinner" meals. In this connection it has also been discovered that at least psychologically and very possibly physically benefits are derived by the dieter if the dieter is permitted to in effect retain any and all of such tickets as may be unused by the dieter and to be permitted to later use such tickets as for a self-reward or a snack at some later time of the same day. Therefore, in the preferred embodiment of the invention, provision is made whereby any unused tickets may be retained within the related container means while the used or spent tickets or tokens are deposited into separate or additional container means. Such contemplated separate or additional container means is illustrated as at 232 of FIG. 1 and, in enlarged scale, in FIG. 10.

Referring to FIG. 1 the additional container means 232 may comprise a front wall 234, with an upper disposed flap-like portion 236 foldable as on a line 238, and a rear wall 240 with such walls being closed as along side edges 242 and 244 and lower or bottom edge 246. The upper edge 248 of rear wall 240, open with respect to front wall 234, is generally closeable by the flap portion 236 when folded thereover. The walls 234 and 240 thusly cooperatively define a pocket or chamber means therebetween. Further, as generally depicted in both FIGS. 1 and 10, a suitable legend such as "SPENT" may be provided on container means 232 as at 250.

In the arrangement of the invention thus for discussed and described, container means 232 would also preferably be received within container means 18 as generally depicted by arrow 252 in FIG. 1.

Accordingly, if the dieter should use only some of the tickets 92, 96 and/or 100 at the respective meals, such used tickets or tokens would be placed within the container means 232 while any unused tickets 92, 96 and/or 100 would be retained in the respective related container means 12, 14 and 16. The dieter, as previously indicated, could use the unused tickets at, for example, the evening to obtain a snack or treat and when thusly used the tickets would be placed in the container means 232.

In any event, at the end of the day as at retiring for the night or the following morning, the dieter would then remove all of the "spent" tickets from the container means 232 and place such tickets into the respective container means 12, 14 and 16 in preparation of the next day's cycle.

FIGS. 6, 7 and 8 illustrate tickets with respective legends "Breakfast", "Lunch" and "Dinner". However, it is also contemplated that additional coding or identification means may also be provided on such ticket or token means for easy group identification as during a sorting process attendant removal of such from the "Spent" container means. Such additional code or identification means may take the form of color codes as, for example: (a) a color band of green provided as at 254 of each of the tickets 92; (b) a color band of red provided as at 256 of each of the tickets 96; and (c) a color band of blue provided as at 258 of each of the tickets 100. In this respect, and for further ease of replacement of tickets into correct container means, it is also contemplated that a complementary code or identification system may be provided for container means 12, 14 and 16. For example: (a) container means 12, as shown in FIG. 3, may be provided with a color band, as at 260, of a color matching the color bands 254 of tickets 92; (b) container means 14, as shown in FIG. 4, may be provided with a color band, as at 262, of a color matching the color bands 256 of tickets 96; and (c) container means 16, as shown in FIG. 5, may be provided with a color band, as at 264, of a color matching the color bands 258 of tickets 100.

Figures 11, 12, 13:
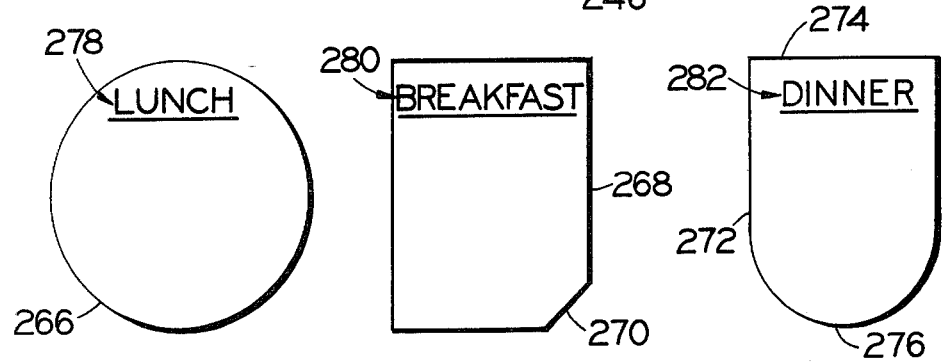
FIGS. 11, 12 and 13 are views respectively illustrating other physical configurations of tickets or the like employable in the practice of the invention.

The tickets, tokens or the like need not have the precise physical configuration depicted in FIGS. 6, 7 and 8. That is, such ticket means may be of any suitable size and shape. For example, FIGS. 11, 12 and 13 illustrate only three of many possible configurations of such ticket means. FIG. 11 illustrates a ticket means 266 as being of a circular configuration. FIG. 12 depicts a ticket means 268 as being of generally square or rectangular configuration having, for example, one corner 270 thereof cut or formed as at a 45° angle while FIG. 13 illustrates a ticket means 272 having its upper or one end 274 similar in configuration to that same end of ticket means 268 while the opposite or lower end 276 is radiused and therefore to that extent similar to ticket means 266. The tickets 266, 268 and 272 may, of course, and are preferably provided with related suitable meal-indicating indicia as at 278, 280 and 282.

Even though the invention contemplates the distinct possibility of employing a single physical configuration for all of the tickets regardless of the meal to which they relate, it is also contemplated that a different physical configuration of tickets may be employed for the respective meals. For example, as depicted by FIGS. 11, 12 and 13, it is further contemplated that the "Lunch" tickets 266 may be of one physical shape, while the "Breakfast" and "Dinner" tickets may be of respective different shapes. Such difference in physical shape would also, in and of itself, constitute a code system and thereby assist in the easy sorting of the tickets as upon removal from the "Spent" container means 232.

Figure 14:
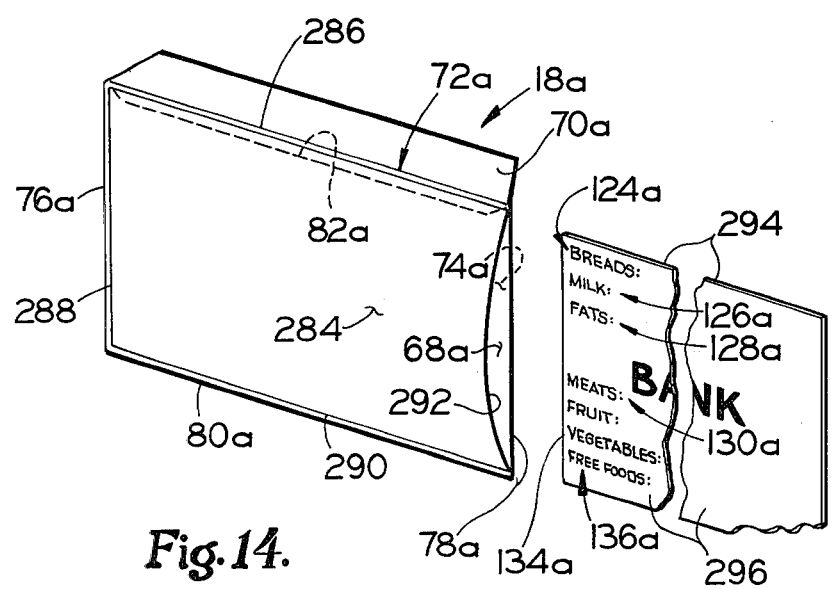
FIG. 14 is a view, in partly exploded-like configuration, illustrating, typically, another embodiment of one of the elements employable in the practice of the invention.

FIG. 14 illustrates a modification of the invention. All elements in FIG. 14 which are like or similar to any of the preceding Figures are identified with like reference numbers provided with a suffix "a". In the modification of the embodiment of FIG. 14, container means 18a is illustrated as comprising a front wall 68a, with an upper disposed flap-like portion 70a foldable as on a line 72a, and a rear wall 74a with such walls being closed as along side edges 76a and 78a and along side edges 76a and 78a and along lower or bottom edge 80a. The upper edge 82a of rear wall 74a, open with respect to front wall 68a, is generally closeable by the flap portion 70a when folded thereover. The walls 68a and 74a cooperatively define a pocket or chamber means therebetween. Further, preferably the front wall 68a is provided with a pocket-like forming overlay or cover means 284 comprised of a transparent material. Such a cover means 284 may be suitably attached and secured to container means 18a as along edges 286, 288 and 290 thereby leaving an open edge or end 292. The pocket thusly formed as between transparent cover means 284 and front wall 68a is, in turn, effective for receiving card or chart like display means 294 which would carry the information (catagories of foods and the specific food items comprising such catagories and other desired information), as typically appears in FIG. 2, on the outer face 296 thereof so that such would be visible through the transparent cover means 284.

Figure 15:
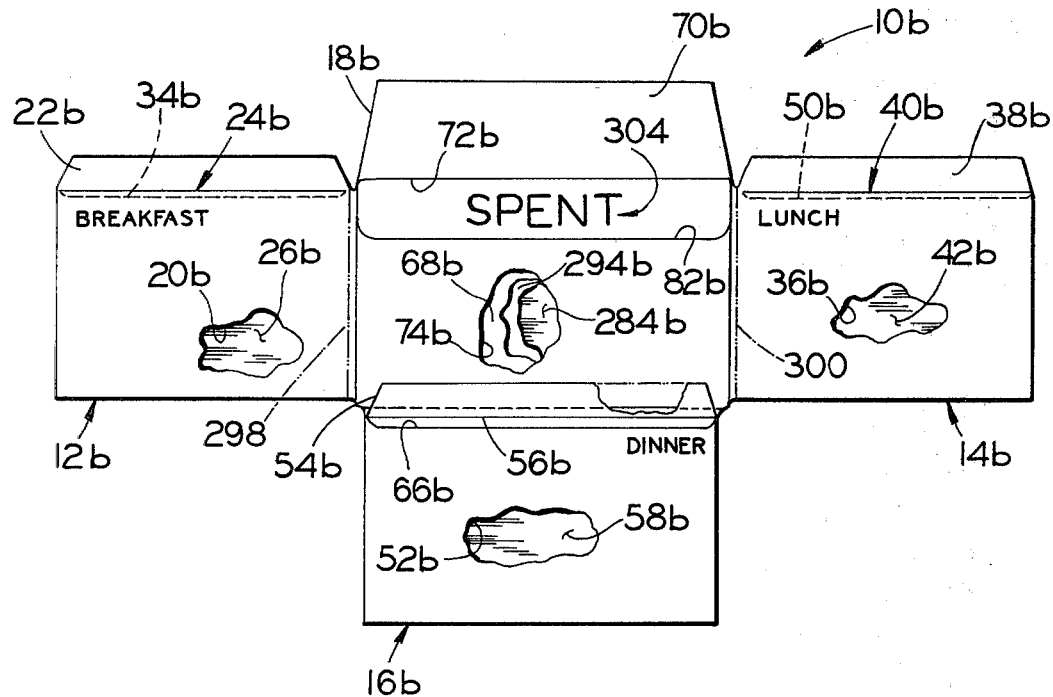
FIG. 15 is a view, in comparatively reduced scale, of still another embodiment of the invention.
Figure 16:
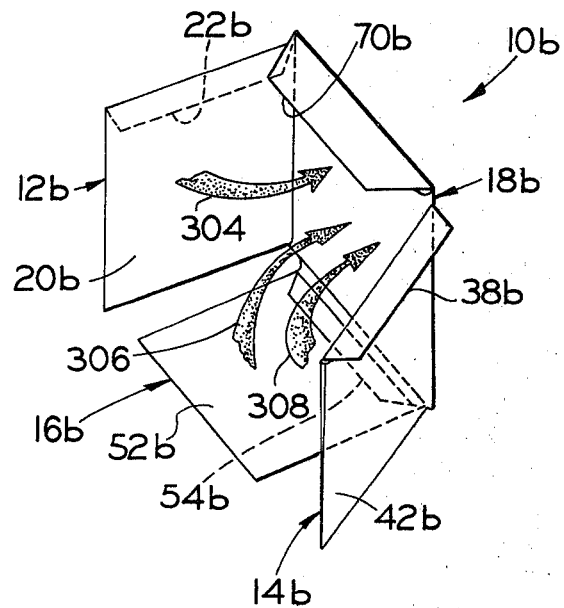
FIG. 16 is a simplified perspective view of the apparatus of FIG. 15 showing one possible manner in which it can be folded for easy and compact carrying on one's person.

FIGS. 15 and 16 illustrate another embodiment of the invention. All elements which are like or similar to any of the elements of any of the preceding Figures are identified with like reference numbers provided with a suffix "b". Referring in greater detail to FIGS. 15 and 16, it can be seen that container means 12b is suitably pivotally or foldably secured along its right edge (as viewed in FIG. 15) as to the left edge of container means 18b and that container means 14b is similarly suitably pivotally or foldably secured along its left edge as to the right edge of container means 18b while container means 16b is suitably pivotally or foldably secured along its upper edge as to the lower or bottom edge of container means 18b. The respective pivot or fold lines may be as generally depicted at 298 and 300 and generally in the vicinity of fold line 56b of flap portion 54b. Another possible variation is illustrated as by, for example, having the word "SPENT" placed on the inside surface 302 container means 18b front wall 68b, as at 304, and to lower the top edge 82b as to thereby make the word "SPENT" visible. The pocket or chamber means thusly defined by walls 68b and 74b could be used for receiving the used or spent tickets as previously described.

As generally illustrated in simplified form in FIG. 16, the apparatus or kit 10b may be folded as to thereby make it compact and easy to carry on ones person. That is, container means 16b could first be folded up against container means 18b, as generally indicated by arrow 304, and then container means 12b could be folded over against the already folded container means 16b, as generally indicated by arrow 306, followed by container means 14b being folded against the already folded container means 12b, as generally indicated by arrow 308. Of course, the various container means may be provided with related legend and indicia means as previously described.

The invention has been described with reference to a weight reduction diet employing three meals per day. However, it should be apparent that the invention may be equally well employed in situations wherein the selected diet is for either a weight increase or for neither an increase or decrease in weight as, for example, where body weight is not that which is to be changed but rather certain foods are to be avoided (or consumed) in order to accommodate a particular body requirement. Further, it should be apparent that the diet control kit of any of the Figures may employ more or less container means and that preferably the number of such container means corresponds to the number of different meals to be consumed by the dieter plus an additional container means into which the used or spent tickets can be deposited. For example, because of various reasons, a particular individual may be prescribed a diet which requires five (or more) meals per day. In such a situation, the dieter, preferably, would have five (or more) container means with five (or more) respective sets of tickets contained thereby. Further, the legend or indicia means as depicted at, for example, 84, 86, 88, 180, 194, 212, 278, 280 and 282 could be replaced merely by meal numbers which could take the form of: "Meal-1"; "Meal-2"; "Meal-3" etc.

It is also contemplated that the invention may comprise the use of an additional form of ticket or token means 310 as in FIG. 9. If such is employed, a ticket 310 would be preferably placed into each of the ticket-containing container means. The purpose of ticket means 310 is merely a further reminder to that particular dieter that the index or chart of foods, as shown in FIGS. 2, 14 and 15, lists certain specific food items which that particular dieter may have at any time during the day in unlimited quantities. Ticket means 310 may be appropriately provided with the words or legend means "ANYTIME See 'Free Foods' List" as to thereby clearly serve as the intended reminder for the dieter.

It should be mentioned, if not already apparent, that in the table, index or chart of foods, as shown, for example, in 110, 112, 114, 116, 118 and 120 (and to some degree in 122) of FIG. 2, the specific items of food are identified along with corresponding respective physical quantitative description or limitation thereof. This quantitative limitation or description then establishes a "unit" or "serving" for which one ticket or token, of the corresponding food catagory, may be redeemed. Accordingly, such quantities are preferably established as to be the smallest practical amount as to be a basic dietary unit and therefore lend itself to easy multiples which can then be created or attained merely by issuance of a multiple quantity of tickets.

It has been discovered that dieters employing the diet control kit of the invention have been able to easily follow the overall diet plan without any associated drudgery and have developed improved eating habits. This is believed to have occurred because the dieter is never selecting items of food for a meal in terms of counting calories but rather selecting merely in terms of items of food the quantity (and species) of which is limited merely by the tickets which the dieter has available to redeem. This is not unlike being limited merely by the money which the person has available to purchase food. Accordingly, after a length of time, the dieter employing the invention thinks in terms of relatively small portions of foods rather than trying to mentally correlate calories to portion sizes, etc.

Further, the invention enables the easy alteration or modification of a diet plan. For example, assuming a weight reduction diet, as the dieter continues to lose weight there may come a time at which such dieter's overall diet should be altered as to start to stabilize weight. With the invention this is easily accomplished as by, for example, merely providing selected additional tickets which the dieter can then add to the overall day's supply.

The elements comprising the invention may be formed of any suitable material; however, it has been found that, for example, a washable plastic material is preferred in that the use of such kit means 10 and 10b occurs primarily at meal time during which there is a tendency to have such elements become spotted or otherwise touched by food substances.

Although only a preferred embodiment and selected modifications of the invention have been disclosed and described, it is apparent that other embodiments and modifications of the invention are possible within the scope of the appended claims.

I claim:

1. Diet control apparatus for use by a dieter in following a diet, comprising a plurality of food token means, container means for receiving said food token means therein, and food chart means, said food chart means comprising a list of specific items of foods, said list of specific items of foods being divided into at least first and second generically designated catagories of foods with each of said first and second catagories comprising a selected plurality of said specific items of foods, each of said specific items of food being identified by a commonly accepted name therefor along with a respective physically measurable quantitative unit thereof, said plurality of food token means comprising at least a plurality of first food token means and a plurality of second food token means, said plurality of first food token means carrying first code means, said first code means functioning to designate a particular meal of the day to which said plurality of first food token means pertain, said plurality of second food token means carrying second code means, said second code means functioning to designate an other meal of the day to which said plurality of second food token means pertain, third code means carried by said plurality of first token means, said third code means functioning to designate to which of said first and second catagories respective ones of said plurality of first food token means pertain, fourth code means carried by said plurality of second food token means, said fourth code means functioning to designate to which of said first and second catagories respective ones of said plurality of second food token means pertain, fifth code means carried by said plurality of first token means, said fifth code means functioning to respectively designate on each of said first token means the number of said quantitative units of food from said selected plurality of said specific items of foods in either of said first and second catagories which may be chosen by the dieter as comprising said particular meal, and sixth code means carried by said plurality of second token means, said sixth code means functioning to respectively designate on each of said second token means the number of said quantitative units of food from said selected plurality of said specific items of foods in either of said first and second catagories which may be chosen by the dieter as comprising said other meal.

2. Diet control apparatus according to claim 1, wherein each of said first and second generically designated catagories is identified on said chart means by a respective related title for each of said catagories, and wherein said titles for said catagories comprise said third code means and said fourth code means.

3. Diet control apparatus according to claim 1, wherein said container means comprises at least first and second container means, wherein said first container means receives said plurality of first food token means, wherein said second container means receives said plurality of second food token means, wherein said first and second container means respectively comprise first and second indicia means, wherein said first indicia means and said first code means each relate to said particular meal, and wherein said second indicia means and said second code means each relate to said other meal.

4. Diet control apparatus according to claim 1, wherein said container means comprises at least first and second containers, wherein said plurality of first food token means are removably received by said first container, wherein said plurality of second food token means are removably received by said second container, said first code means facilitating the segregation of said plurality of first food token means into a group representing said particular meal and for placement into said first container, said second coding means facilitating the segregation of said plurality of second food token means into a group representing said other meal and for placement into said second container.

5. Diet control apparatus according to claim 4 wherein said first code means comprises a color code.

6. Diet control apparatus according to claim 1 wherein said container means comprises at least first second and third containers, wherein said plurality of first and second food token means are removably received respectively in only said first and second containers, and wherein said food chart means is carried by said third container.

7. Diet control apparatus according to claim 6 wherein said food chart means is physically separate from said third container.

8. Diet control apparatus according to claim 6 wherein said third container comprises a wall portion which in turn comprises transparent material, wherein said wall portion defines a pocket-like chamber, wherein said food chart means comprises a chart member physically separate from said third container, and wherein said chart member is removably receivable within said pocket-like chamber as to be visible through said transparent material.

9. Diet control apparatus according to claim 6 wherein said third container defines chamber means effective for removably receiving therein both of said first and second containers.

10. Diet control apparatus according to claim 6 wherein all of said first second and third containers are physically separate from each other, and wherein each of said first second and third containers is of an envelope-like configuration having an open side, and a flap portion carried by each of said first second and third containers effective to at times close said open side.

11. Diet control apparatus according to claim 1 and further comprising additional container means for receiving therein such of said plurality of first and second food token means as employed by said dieter in choosing from said specific items of food.

12. Diet control apparatus according to claim 1 wherein said container means comprises structure defining a plurality of distinct chamber means, wherein respective ones of said plurality of distinct chamber means relate to respective ones of said meals to be consumed by said dieter during a day, and wherein said plurality of food token means are received within said plurality of distinct chamber means according to said respective meals to which said plurality of food token means relate.

13. Diet control apparatus according to claim 12 wherein said structure is foldable as to enable the folding thereof in a manner whereby said plurality of distinct chamber means are placed in a generally successive juxtaposed relationship with respect to each other.

14. Diet control apparatus according to claim 12 wherein said structure also comprises an additional spent chamber, said spent chamber being effective for receiving therein such of said plurality of food token means as have been employed by said dieter in choosing from said specific items of food, wherein said structure is foldable in a manner whereby said plurality of distinct chamber means and said spent chamber are placed in a generally successive juxtaposed relationship with respect to each other.

15. Diet control apparatus according to claim 1 wherein all of said plurality of food token means have substantially identical physical configurations.

16. Diet control apparatus according to claim 1 wherein said first and second code means comprises a color code.

17. Diet control apparatus according to claim 1 wherein said container means comprises at least first second and third containers, wherein said plurality of first and second food token means are removably received respectively in only said first and second containers, wherein said food chart means is carried by said third container, wherein said food chart means is physically separate from said third container, wherein said third container comprises a wall portion which in turn comprises transparent material, wherein said wall portion defines a pocket-like chamber, wherein said food chart means comprises a chart member, wherein said chart member is removably received in said pocket-like chamber as to be visible through said transparent material, and wherein said third container comprises chamber means effective for removably receiving therein both of said first and second containers.

18. Diet control apparatus according to claim 1 wherein said container means comprises at least first second and third containers, wherein said plurality of first and second food token means are removably received respectively in only said first and second containers, wherein said food chart means is carried by said third container, wherein said food chart means is physically separate from said third container, wherein said third container comprises a wall portion which in turn comprises transparent material, wherein said wall portion defines a pocket-like chamber, wherein said food chart means comprises a chart member, wherein said chart member is removably received in said pocket-like chamber as to be visible through said transparent material, wherein said third container comprises chamber means effective for removably receiving therein both of said first and second containers, wherein all of said first second and third containers are physically separate from each other, and wherein each of said first second and third containers is of an envelope-like configuration having an open side, and further comprising a flap portion carried by each of said first second and third containers effective to at times close said open side.

19. Diet control apparatus, comprising food token means, container means effective for receiving said food token means therein, and food chart means, said food chart means comprising a list of specific foods along with respective physical quantitative limits, each of said quantitative limits defining a respective unit of said specific foods, said token means comprising legend means, and said token means being employable for being redeemed for such units of such of said specific foods as defined by said legend means, said container means comprising structure defining a plurality of distinct chamber means, wherein respective ones of said plurality of distinct chamber means relate to respective meals to be consumed by a dieter during a day, wherein said food token means are received within said plurality of distinct chamber means according to said respective meals to which said food token means relate, wherein said structure also comprises an additional spent chamber, said spent chamber being effective for receiving therein such of said food token means as are redeemed, said structure being foldable in a manner whereby said plurality of distinct chamber means and said spent chamber are placed in a generally successive juxtaposed relationship with respect to each other, wherein said structure further comprises a generally medially situated first body portion with said spent chamber being defined by said first body portion, a second body portion operatively connected along one of its ends to a first end of said first body portion with one of said plurality of distinct chamber means being defined by said second body portion, a third body portion operatively connected along one of its ends to a second end of said first body portion with a second of said plurality of distinct chamber means being defined by said third body portion, a fourth body portion operatively connected along one of its ends to a third end of said first body portion with a third of said plurality of distinct chamber means, wherein said second body portion is foldable with respect to said first body portion generally about where said first and second body portions are operatively connected to each other, wherein said third body portion is foldable with respect to said first body portion generally about where said third and first body portions are operatively connected to each other, and wherein said fourth body portion is foldable with respect to said first body portion generally about where said fourth and first body portions are operatively connected to each other.

* * * * *

UNITED STATES PATENT AND TRADEMARK OFFICE
CERTIFICATE OF CORRECTION

PATENT NO. : 4,310,316
DATED : January 12, 1982
INVENTOR(S) : Patricia L. Thomann It is certified that error appears in the above—identified patent and that said Letters Patent is hereby corrected as shown below:

Column 2, line 23, immediately before "items" change "good" to --- food ---

Column 4, line 30, immediately after "the" delete "37"

Signed and Sealed this

Twentieth Day of July 1982

[SEAL]

Attest:

GERALD J. MOSSINGHOFF

*Attesting Officer*  *Commissioner of Patents and Trademarks*